Dec. 28, 1948.     K. WILLIAMS     2,457,764
HAND BRAKE

Filed Aug. 7, 1946     3 Sheets-Sheet 1

Inventor:
Keith Williams.
By George I. Haight
Atty.

Dec. 28, 1948.                K. WILLIAMS                2,457,764
                               HAND BRAKE
Filed Aug. 7, 1946                                3 Sheets-Sheet 2

Inventor:
Keith Williams.
By George I. Haight
   Atty.

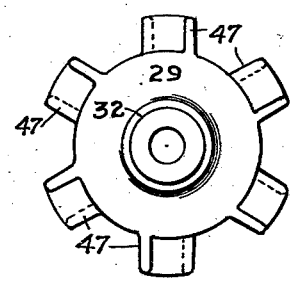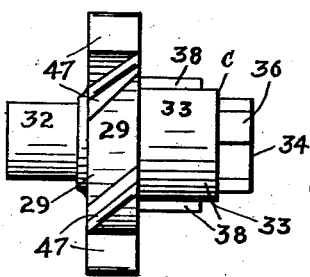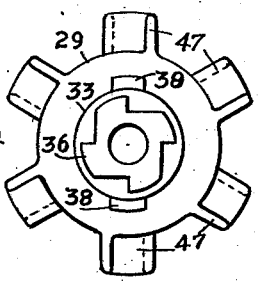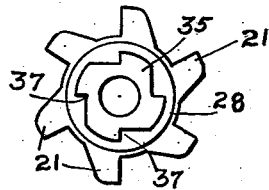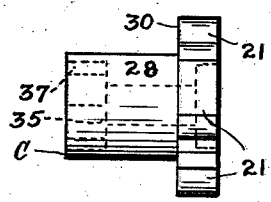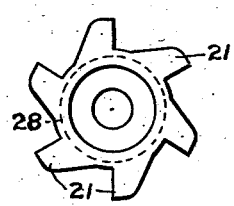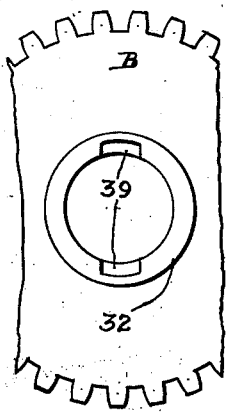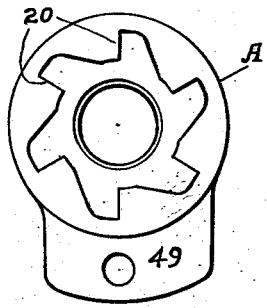

Patented Dec. 28, 1948

2,457,764

UNITED STATES PATENT OFFICE 2,457,764

HAND BRAKE

Keith Williams, Buffalo, N. Y.

Application August 7, 1946, Serial No. 688,858

5 Claims. (Cl. 74—505)

This invention relates to improvements in hand brakes.

One object of the invention is to provide a hand brake mechanism for railway cars, comprising a chain-winding drum and manually-actuated rotary means for rotating the drum to either wind the chain thereon to tighten the brakes or unwind the chain therefrom to effect releasing action of the brakes, wherein automatic quick release is obtained by disconnecting the drum from the manually-actuated rotary means by a predetermined amount of rotation of the latter in chain-unwinding direction.

A further object of the invention is to provide in a hand brake mechanism of the character described, employing releasable clutch means between the manually-actuated means and the rotary drum for operatively connecting the same, simple and efficient means for disengaging the clutch means through rotation of the manually-actuated means in chain-unwinding direction, comprising a cam-acting, clutch-shifting means which is effective to shift the clutch only when the manually-actuated means is rotated in chain-unwinding direction.

A more specific object of the invention is to provide a hand brake mechanism, as set forth in the preceding paragraph, wherein the cam-acting, clutch-shifting means comprises a ratchet member fixed to the shiftable element of the clutch means and rotatable therewith and a cooperating, pivoted, combined pawl and cam element engaging said ratchet member to shift the clutch element to disengage the latter from the chain-winding drum to permit free rotation thereof.

Other objects of the invention will more clearly appear from the description and claims hereinafter following.

Figure 1:
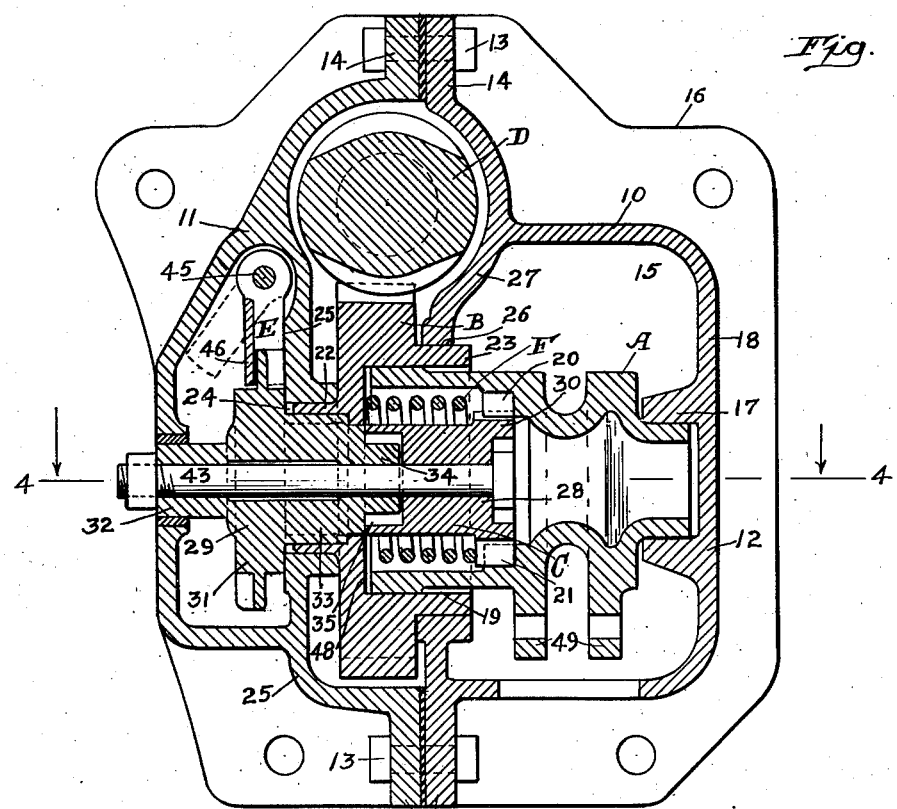
Figure 2:
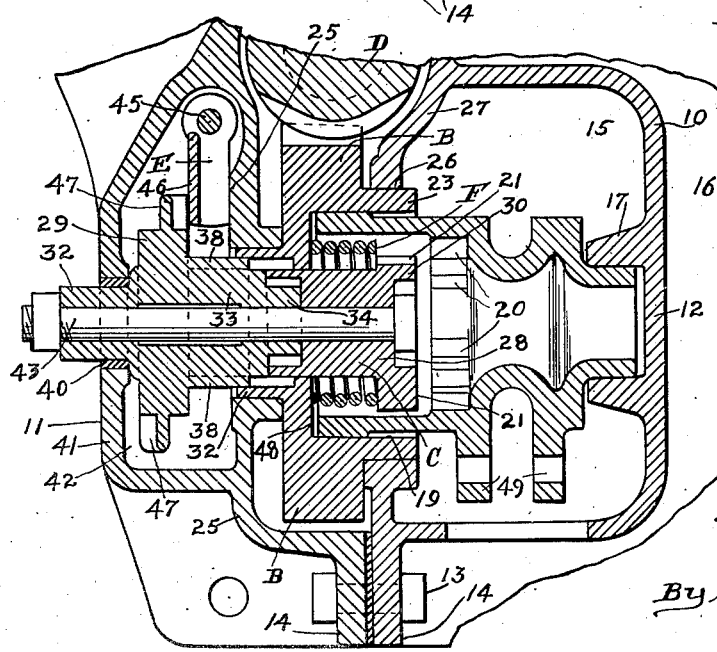
Figure 3:
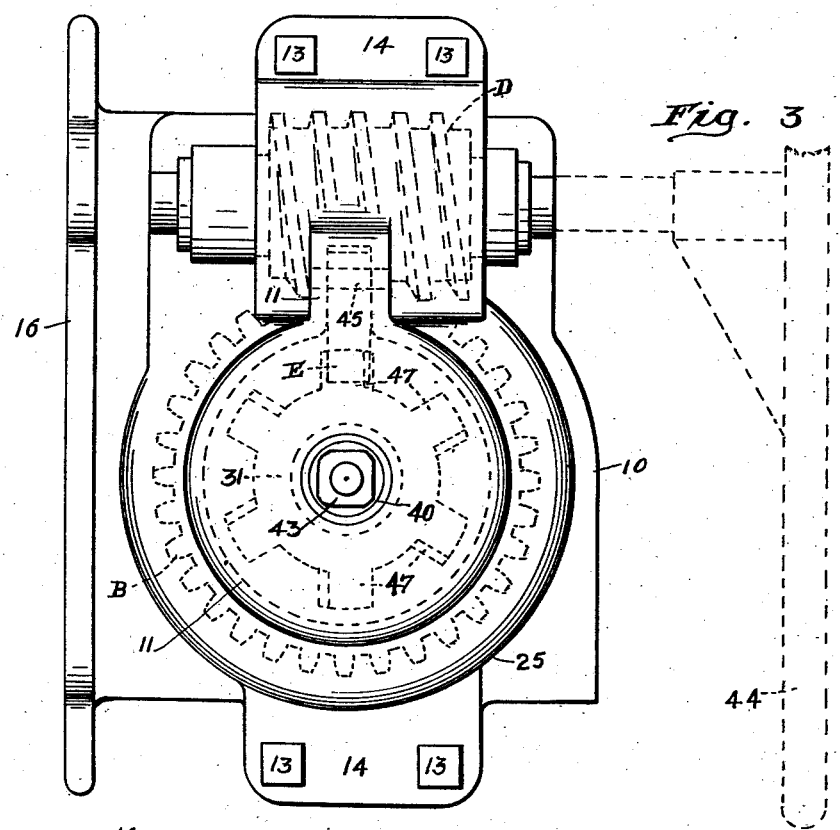
Figure 4:
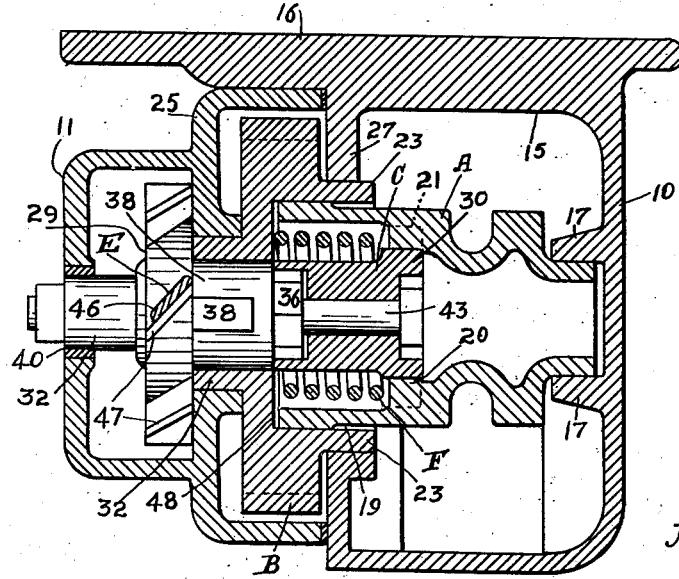

In the accompanying drawings, forming a part of this specification, Figure 1 is a transverse, vertical, sectional view of my improved hand brake mechanism, the mechanism being shown in the position it occupies when applied to a car. Figure 2 is a view similar to Figure 1, partly broken away, showing the positions occupied by the parts of the brake mechanism when the clutch is disengaged. Figure 3 is a side elevational view of the improved brake mechanism, looking from left to right in Figure 1. Figure 4 is a horizontal, sectional view, corresponding substantially to the line 4—4 of Figure 1, showing the shiftable clutch means and cooperating parts in plan and the clutch-shifting pawl in horizontal section. Figure 5 is an end elevational view of the ratchet wheel of the clutch-shifting means, looking from left to right in Figure 1. Figure 6 is a side elevational view of Figure 5, looking from right to left in said figure. Figure 7 is an end elevational view of Figure 6, looking from right to left in said figure. Figure 8 is an end elevational view of the shiftable clutch element proper, looking from left to right in Figure 1. Figure 9 is a side elevational view of Figure 8, looking from right to left in said figure. Figure 10 is an elevational view of Figure 9, looking from right to left. Figure 11 is an end elevational view of the chain-winding drum, looking from left to right in Figure 1. Figure 12 is an elevational view, partly broken away, of the worm wheel of my improved hand brake mechanism, looking from left to right in Figure 1.

My improved hand brake mechanism, as shown in the drawings, comprises broadly a chain-winding drum A; a worm wheel B; a sliding clutch element C operatively connecting the drum to the worm wheel; a worm D meshing with the worm wheel and actuated by the usual hand wheel of the brakes; a clutch shifting member or finger E; and a clutch spring F.

As shown in the drawings, my improved hand brake mechanism is preferably enclosed in a two-part, vertically divided housing 10, comprising sections 11 and 12. Each section of the housing is in the form of a chamber. The sections 11 and 12 are secured to each other by bolts 13 extending through suitable flanges 14 on said sections. The back wall of the housing 10, which back wall is indicated by 15, is extended laterally outwardly of the housing proper to provide securing flanges or lugs 16 for mounting the mechanism on the end wall of a car.

The chain-winding drum A is rotatably mounted within the housing section 12, having the right-hand end thereof, as seen in Figure 1, journaled in a bearing member 17 projecting from the inner side of the right-hand side wall 18 of the housing. The opposite end of the drum is supported by the worm wheel B, the latter being provided with a cylindrical bearing opening or seat 19 within which said end of the drum is journaled. As shown, the drum A is hollow and open at its left-hand end and has internal clutch teeth 20 spaced inwardly from said open end, which cooperate with clutch teeth 21 on the clutch element C.

The worm wheel B has hollow hub members 22 and 23 at opposite sides thereof by which it is supported, the hub member 22 being journaled in a bearing opening 24 provided in the left-hand side wall 25 of the housing 10, and the hub member 23 being journaled in a bearing opening 26 provided in a vertical partition wall 27 formed on the section 12 of the housing and separating the chambers provided by the sections 11 and 12.

The clutch element C is slidingly supported by the worm wheel B and has rotation therewith. The clutch element C is preferably made of two parts 28 and 29 to facilitate assembling with the other parts of the brake mechanism. The part 28 is in the form of a cylindrical member having a clutch head 30 at its inner or right-hand end, as seen in Figure 1. The clutch head 30 carries the teeth 21 hereinbefore referred to, which teeth cooperate with the teeth 20 of the drum A. The part 29 of the clutch element C comprises a ratchet wheel 31 having hub members 32 and 33 at opposite sides thereof. The hub member 33 is of the same diameter as the cylindrical portion of the part 28 of the clutch element and is engaged with the latter, on which it bears, by a reduced projecting portion 34 which is seated in a socket 35 in the adjacent end of the part 28, the projection 34 having external teeth 36 interlocked with internal teeth 37 formed in the socket, as shown in Figures 6, 7, and 8. The clutch element C is rotatable with the worm wheel B and is supported for axial sliding movement with respect to the same and the chain-winding drum, having the sub member 33 of the part 29 thereof slidingly supported in the hub member 22 of the worm wheel, said hub member 33 being provided with integral key members 38—38 engaged in keyways or slots 39—39 in the worm wheel B. The part 28 of the clutch element C extends into the hollow portion of the drum A with the clutch teeth 21 thereof normally engaged with the clutch teeth 20 of said drum. The outer end of the clutch element C is supported by the hub member 32 of the part 29 of said element, the hub member 32 being rotatably journaled and lengthwise slidable in a bearing opening 40 provided in the vertical outer wall 41 of a compartment or chamber 42 on the outer side of the section 11 of the housing. The parts of the clutch element C are held together by a clamping bolt 43 extending therethrough and having the head thereof seated in a socket at the inner end of the part 28 and the nut thereof seated against the outer end of the hub member 32 of the part 29.

The worm D, which meshes with the worm wheel B, is arranged above the latter, being rotatably supported in suitable bearings provided in the housing 10. The worm D is rotated by the usual hand wheel 44, indicated in dotted lines in Figure 3.

The clutch-shifting member or finger E is in the form of a combined pawl and cam element mounted within the chamber 42 above the ratchet wheel 31, being swingingly supported on a horizontal pivot pin 45 extending through the upper end of the same and having its opposite ends fixed in the side walls of the chamber 42. As shown in the drawings, the pivot pin 45 is arranged at right angles to the axis of rotation of the clutch element C, thus supporting the member E for swinging or pivotal movement in a plane parallel to said axis of rotation of the element C and of the ratchet wheel 31. The body portion of the pivoted clutch-shifting finger or member E is in the form of an elongated flat blade 46, the lower end of which engages with peripheral teeth 47 on the ratchet wheel 31. The teeth 47 of the ratchet wheel are inclined transversely with respect to the ratchet wheel; in other words, each tooth 47 is inclined transversely with respect to a plane radial to the axis of rotation of the ratchet wheel. The blade 46 of the pivoted clutch-shifting member or finger E is inclined in transverse direction to correspond with the inclination of the teeth 47. In the pendant position of the finger E, as shown in full lines in Figure 1, it bears against the vertical wall 25 of the housing and this wall acts as a limiting stop preventing the finger E from swinging to the right; however, the same is free to swing to the left. Upon rotation of the ratchet wheel in left-hand direction, as viewed from the left in Figures 1, 2, and 4, the finger E will ratchet over the teeth of the ratchet wheel being forced to swing to the left by camming action of the teeth. Inasmuch as the finger E is held against swinging movement to the right, as viewed in Figures 1, 2, and 4, rotation of the ratchet wheel in a reverse or right-hand direction, through camming engagement of the teeth of the ratchet wheel with the blade of the element C, effects shifting of the ratchet wheel and the clutch element C, of which the ratchet wheel forms a part, to the left to disengage the clutch element from the drum A.

The clutch spring F is employed to yieldingly hold the clutch element C engaged with the drum A. This spring surrounds the cylindrical portion of the part 28 of the clutch element and has its opposite ends bearing on the clutch head 30 and the end wall 48 of the seat 19 of the hollow hub member 23 of the worm wheel B.

The operation of my improved hand brake mechanism is as follows: To apply the brakes, the worm D is rotated in clockwise direction, as seen in Figure 1, thereby rotating the worm wheel in contraclockwise direction, as viewed from the left in Figures 1 and 4. The clutch element C being rotatable in unison with the worm wheel effects rotation of the drum through clutching engagement therewith to wind the brake chain thereon. As is well known to those skilled in this art, the brake chain, which is not shown in the drawings, has one end connected to chain-anchoring lugs 49—49 of the drum and leads to the brake mechanism proper of the car. During the chain-winding operation, the pivoted finger or shifting member E ratchets over the teeth 47 of the ratchet wheel 31 of the clutch element C, swinging to the left during this ratcheting action. In effecting release of the brakes, the worm wheel is rotated in a direction reverse to the rotation thereof in winding the chain on the drum, thereby effecting rotation of the worm wheel B, clutch element C, and the drum A in reverse direction also. During this rotation of the parts in chain-unwinding direction, the pivoted finger or shifting member E is held against swinging movement to the right by being buttressed against the wall 25 of the housing, and the ratchet teeth 47 of the ratchet wheel 31 of the rotary clutch element C acting on the shifting member or finger E cam the clutch element to the left, thereby shifting the same to the disengaged position shown in Figure 2 and freeing the drum for rotation with respect to the other parts of the mechanism, thereby allowing the chain to unwind without rotation of the hand wheel and other parts of the driving mechanism. As will be evident, the extent to which the brakes may be backed off or released by rotation of the hand wheel before complete quick release is obtained by free rotation of the drum is dependent upon the spacing of the ratchet teeth 47 and the inclination of the teeth and cooperating blade of the shifting finger E. This means is preferably designed so that the amount of backward rotation of the hand wheel, which is permitted before quick release of the brakes is obtained, is sufficient to provide for the required backing-off of the brakes to take care of the usual switching operations. Restoration of the clutch element C to the normal position shown in Figure 1 is effected by the expansive action of the spring F, the latter shifting the clutch element to its operative clutching position when the drum A comes to rest.

I claim:

1. In a hand brake mechanism, the combination with a rotary chain-winding member; of a rotary driving member; a sliding, shiftable clutch element rotatable with said driving member and having clutching engagement with said chain-winding member; a ratchet wheel fixed to said clutch element for rotation and sliding movement in unison therewith; a pivoted pawl freely swingable in one direction to ratchet over said wheel; means for blocking said pawl against swinging in a reverse direction; and cam means on said ratchet wheel engageable with said pawl in its blocked condition for shifting said ratchet wheel and clutch element to disengage the latter from the winding member when the clutch element is rotated in chain-unwinding direction.

2. In a hand brake mechanism, the combination with a rotary chain-winding member; of a rotary driving member; a sliding, shiftable clutch element rotatable with said driving member and having clutching engagement with said winding member; a pivoted shifting finger; an abutment for arresting swinging movement of said finger, said finger being swingable away from and toward said abutment; and an annular series of cam projections on said clutch element cooperating with said pivoted finger, said finger ratcheting over said projections upon rotation of the clutch element in chain-winding direction, said projections having camming engagement with the shifting finger in its arrested condition for shifting the clutch element to disengage the same from the winding drum during rotation of the clutch element in chain-unwinding direction.

3. In a hand brake mechanism, the combination with a rotary chain-winding member; of a rotary driving member; a sliding, shiftable clutch element rotatable with said driving member and having clutching engagement with said winding member; a ratchet wheel fixed to said clutch element, said ratchet wheel having transversely inclined teeth; a pivoted pawl swingable on an axis at right angles to the axis of rotation of the ratchet wheel, said pawl having a blade portion engageable with the teeth of the ratchet wheel, the engaging portion of said blade being correspondingly inclined to the teeth of the ratchet wheel; and a stop in the path of swinging movement of said pawl blocking movement of the same during rotation of the ratchet wheel and clutch element in chain-unwinding direction, thereby shifting said ratchet wheel and clutch element to disengage the latter from the winding member through camming engagement of the teeth of the ratchet wheel and pawl.

4. In a hand brake mechanism, the combination with a rotary chain-winding member; of a rotary driving member; a sliding, shiftable clutch element rotatable with said driving member and having clutching engagement with said winding member; a swinging bladelike pawl pivotally supported at its upper end to swing about an axis at right angles to the axis of rotation of the clutch element, said bladelike pawl being transversely inclined with respect to the axis of rotation of the clutch element; an annular series of peripheral ratchet teeth on said clutch element engageable by said pawl, said ratchet teeth being transversely inclined with respect to the axis of rotation of said clutch element, said inclination of the teeth and the pawl being in the same direction, said pawl being free to swing to one side of its pendant position to ratchet over said teeth upon rotation of the clutch element in chain-winding direction; and an abutment member in the path of swinging movement of the pawl to block the same from movement to the other side of its pendant position to cam said clutch element to disengaged position upon rotation of the clutch element in chain-unwinding direction.

5. In a hand brake mechanism, the combination with a rotary chain-winding member; of a rotary driving member; a sliding, shiftable clutch element rotatable with said driving member and having clutching engagement with said chain-winding member; an annular series of peripheral cam projections on said clutch element; and a pivoted cam finger engageable with said series of cam projections, said finger being swingable to one side of its engaged position into and out of the path of movement of said projections to ratchet thereover upon rotation of said clutch element in chain-winding direction, and being locked against swinging movement to the other side of said engaged position to maintain the same in the path of movement of said cam projections and when so locked being engaged by said cam projections to cam said clutch element to disengaged position upon rotation of said clutch element in chain-unwinding direction.

KEITH WILLIAMS.

REFERENCES CITED

The following references are of record in the file of this patent:

UNITED STATES PATENTS

| Number | Name | Date |
| --- | --- | --- |
| 1,909,952 | Haseltine | May 23, 1933 |
| 1,928,027 | Olander | Sept. 26, 1933 |
| 2,049,715 | Olander | Aug. 4, 1936 |
| 2,090,757 | Heitner | Aug. 24, 1937 |